Dec. 8, 1959        H. JEFFERY        2,916,015
POWER-OPERATED STEERING MECHANISM FOR ROAD VEHICLES
Filed Dec. 26, 1956
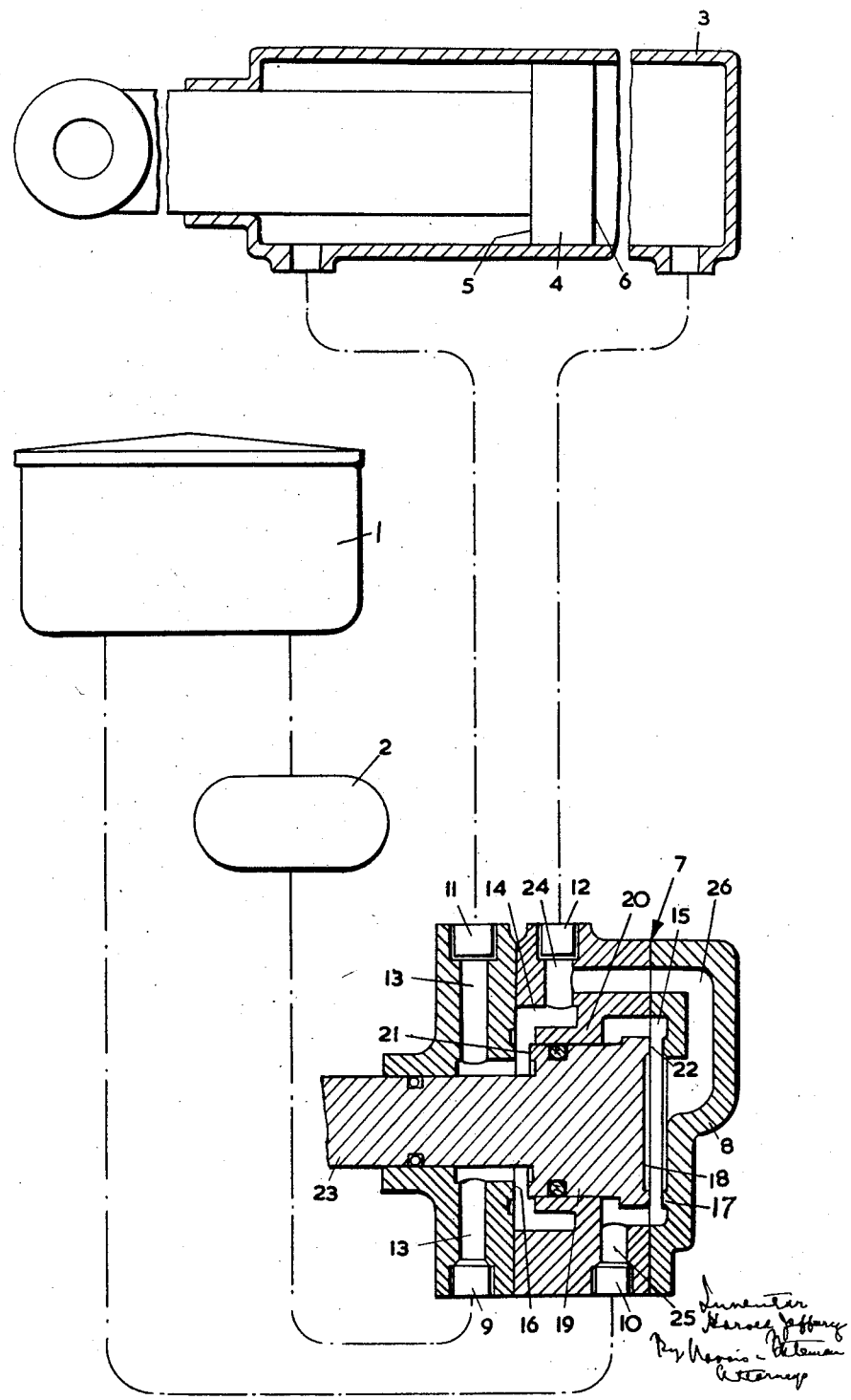

United States Patent Office 2,916,015
Patented Dec. 8, 1959

2,916,015

POWER-OPERATED STEERING MECHANISM FOR ROAD VEHICLES

Harold Jeffery, Lincoln, England, assignor to Clayton Dewandre Company Limited, Lincoln, England, a British company Application December 26, 1956, Serial No. 630,548

Claims priority, application Great Britain January 5, 1956

4 Claims. (Cl. 121—38)

This invention relates to power steering mechanisms for road vehicles and has particular reference to mechanisms of the kind comprising a power cylinder operated by pressure developed in a constant-flow hydraulic circuit under the control of a valve actuated by rotational movement of the steering wheel. The hydraulic circuit includes a pump and a reservior, and the control valve, which is interposed between the pump and the reservoir, is operable to interrupt the flow in the circuit so that the pump builds up pressure therein, and to direct this pressure to the power cylinder. Liquid displaced from the cylinder due to the resulting operation thereof is directed by the valve back to the reservoir.

The object of the present invention is to provide an improved steering mechanism of the above kind, wherein the number of components employed in the control valve is reduced in comparison with the valves used in existing mechanisms of this kind. The invention thereby aims to simplify the construction of the control valve and reduce the size thereof so that it can be readily accommodated in the limited space available for such equipment on modern vehicles.

According to the invention a power steering mechanism of the kind referred to comprises a pump, a reservoir, a control valve interposed between said pump and reservoir, and a double-acting power cylinder having a piston with differential areas in the ratio of 2:1, or substantially so, said control valve being adapted normally to permit free flow of liquid from the pump to the reservoir and being operable to interrupt said flow so that pressure is built up by the pump and cause said pressure to act either on only the smaller area of said piston or on both areas thereof simultaneously.

According to a preferred form of the invention the control valve is adapted permanently to maintain the smaller area of the piston in communication with the pump and normally to maintain the larger area of the piston in communication with the pump and the reservoir, and has a double-acting valve element which is operable with one seating action to interrupt the flow of liquid from the pump to the reservoir and cut off the larger area of the piston from the pump so that pressure is built up by the pump and acts only on the smaller area of the piston, and with another seating action to interrupt said flow and cut off the larger area of the piston from the reservoir so that pressure is built up by the pump and acts on both areas of the piston simultaneously.

Reference will now be made to the accompanying drawing which illustrates an embodiment of the invention in sectional elevation.

In this embodiment the power steering mechanism comprises a reservoir 1, a pump 2, a double-acting power cylinder 3 having a piston 4 with differential areas 5 and 6, and a control valve 7. The control valve includes a casing 8 having an inlet 9 and an outlet 10 connected with the pump and the reservoir respectively, a port 11 connected with the space in the power cylinder adjacent the smaller area 5 of the piston, and a port 12 connected with the space in the power cylinder adjacent the larger area 6 of the piston. A passage 13 extends through the casing from the inlet to the port 11 so that the smaller area of the piston is in perament communication with the pump. Within the casing are two valve chambers 14 and 15 in which are formed two annular valve seats 16 and 17 respectively. The valve seats are co-axially disposed at the far ends of the valve chambers, which are formed next to one another, and between the valve seats is disposed a double-acting valve element 18. The latter has a cylindrical head 19 which is slidably guided in a wall or partition 20 separating the two valve chambers, and which is formed on opposite sides with two co-axial annular valve faces 21 and 22. The valve face 21 is located in the valve chamber 14 for engagement with the valve seat 16, and the other one 22 is located in the valve chamber 15 for engagement with the valve seat 17. The valve element also has a stem 23 which extends with clearance through the valve seat 16 and is slidably guided in the wall of the casing. The stem extends externally of the casing for connection with an actuating member (not shown) that is movable in opposite directions by the vehicle's steering wheel. The valve chamber 14 has permanent communication with the port 12 through a passage 24 in the valve casing and communicates through the valve seat 16 with the passage 13 leading from the inlet 9, and the valve chamber 15 has permanent communication with the outlet 10 through a passage 25 in the valve casing and communicates with the port 12 through the valve seat 17 and a passage 26 leading into the valve seat from the passage 24. The valve chamber 15 also communicates with the chamber 14 through the passages 24 and 26 and the valve seat 17.

In its normal or neutral position, as shown in the drawing, the valve element 18 is completely unseated, that is to say, its two valve faces 21 and 22 are disengaged from the two valve seats 16 and 17, and the liquid in the hydraulic circuit flows freely from the pump to the reservoir via the inlet 9, the passage 13, the valve seat 16, the valve chamber 14, the passages 24 and 26, the valve seat 17, the valve chamber 15 and the outlet 10. Thus the power piston remains at rest. With the valve element in this position the larger area 6 of the piston communicates with the pump via the port 12, the passage 24, the valve chamber 14, the valve seat 16, the passage 13 and the inlet 9, and with the reservoir via the port 12, the passages 24 and 26, the valve seat 17, the valve chamber 15, the passage 25 and the outlet 10.

Upon rotational movement of the steering wheel in one direction or the other, the valve element is moved axially in a corresponding direction to engage either the valve seat 16 or the valve seat 17. If it engages the valve seat 16 it interrupts the hydraulic circuit at that point so that pressure is built up by the pump, and in the same seating action cuts off the larger area 6 of the power piston from the pump whilst leaving it in communication with the reservoir through the valve seat 17. Thus the pressure from the pump is free to act on the smaller area 5 of the piston, through the passage 13 and port 11, but not on the larger area, and the piston is moved accordingly. Liquid displaced by the larger area of the piston is returned to the reservoir. If the valve element engages the valve seat 17 it will also interrupt the hydraulic circuit so that pressure is built up by the pump. In this seating action, however, the valve element cuts off the larger area of the piston from the reservoir and leaves it in communication with the pump so that the pressure therefrom is free to act on both areas of the piston. Due to the inequality of these areas the piston will be subjected to unequal forces and will be moved in the opposite direction to that in which it is moved by pressure acting on its smaller area only. The areas are unequal in the ratio of 2:1, or substantially so, so that the force acting to move the piston will be the same or substantially the same in either direction for any given pressure.

During the operation of the mechanism the pressure acting in the power cylinder also reacts against the valve element through the valve seat with which it is engaged and tends to return it to its neutral position. This reaction, which is proportional to the force actuating the power piston, is transmitted back to the steering wheel and gives the operator a "feel" of the power-assistance being applied to the steering. In order to balance the reaction so as to hold the valve element on its seat, an increased manual effort must be applied to the steering wheel. Thus the power output is at all times proportional to the manual input and increases progressively therewith.

The power cylinder is secured to a fixed point on the vehicle, such as the frame, and the piston is connected to the drop arm of the steering box or to any other convenient movable component of the steering assembly. Alternatively the piston can be anchored to the frame and the cylinder be arranged to move and be connected to the drop arm or other movable component of the steering assembly.

I claim:

1. A power-operated steering mechanism for vehicles including a fluid pressure operated power cylinder, a piston operative in said cylinder and having differential areas in the ratio of substantially 1:2, and a fluid control valve for said cylinder comprising a valve casing having a passageway permanently connecting the end of the cylinder at the smaller area side of said piston to a source of fluid pressure supply and first and second chambers having opposed first and second valve seats therein one in each chamber, said first chamber being in permanent communication with said cylinder at the larger area side of said piston and connected to said passageway through said first valve seat and said second chamber being in permanent communication with an exhaust and connected to said first chamber and to the cylinder at the larger area side of the piston through said second valve seat, and a reciprocable valve element operative by selective movement thereof into a first position to disengage it from said first seat and thereby establish communication between said passageway and said first chamber to admit pressure fluid to the cylinder at the larger area side of the piston and to engage it with said second valve seat to thereby interrupt communication between the said cylinder at the larger area side of said piston and the exhaust through said second chamber and to build up pressure at the larger area side of said piston, said valve element being operative by movement thereof into a second position to disestablish communication between said passageway and said first chamber to thereby interrupt the flow of pressure fluid to the larger area side of said piston and to establish communication between the latter side of the piston and the exhaust via said second chamber, and means tending to continuously restore said valve element by fluid pressure to a neutral valve seat disengaging position between said first and second positions wherein communication between both sides of said piston is established with said exhaust.

2. A power-operated steering mechanism for vehicles having a fluid pressure operated power cylinder and a piston therein with differential areas in the ratio of substantially 1:2, means for maintaining the cylinder at the smaller area side of the piston permanently in communication with a source of fluid pressure supply and a control valve comprising first and second annular valve seats through which the larger area side of the piston communicates with the source of fluid supply and the exhaust respectively and which together provide passage for the flow of fluid from the source of fluid pressure supply to the exhaust, and a cooperative valve element having first and second faces for seating on said first and second valve seats respectively, said valve element being normally balanced to occupy a neutral position by unseating of both valve faces and being selectively movable in opposite directions to respectively bring its first face into engagement with said first valve seat to interrupt the flow of fluid from the source of fluid pressure supply to the exhaust and cut off the supply of fluid from such source to the larger area side of the piston so that pressure is built up and acts only on the smaller area side of the piston, or to bring its second face into engagement with said second valve seat to interrupt the flow of fluid to the exhaust and establish flow of fluid from the source of fluid pressure supply to the larger area side of the piston so that pressure is built up by the source of fluid pressure supply to act on both areas of the piston simultaneously.

3. In a power-operated steering mechanism for vehicles, a fluid motor having relatively movable double acting power piston and cylinder elements wherein one of said elements is adapted to be operatively connected to a steering linkage, supply means having an inlet and an outlet for supplying pressure fluid to said fluid motor to move said element connected to said steering linkage, and means for controlling the delivery of pressure fluid to said fluid motor to establish selective movement of said element connected to said steering linkage in opposed directions, comprising valve means adapted to be selectively movable by manual control between first and second operative positions and a neutral position, passageway means for establishing permanent communication between the outlet of said supply means and one end of said double-acting piston element and capable of moving said element connected to said steering linkage in a first direction irrespective of the position of said valve means, means for establishing communication between the other end of said double-acting piston and the inlet of said supply means and for disestablishing communication between said one end of said double-acting piston element and said inlet when said valve means is selectively moved to said first position to thereby move said element connected to said steering linkage in said first direction, means for establishing communication between said one end of said double-acting piston element and said inlet and for disestablishing communication between said other end of said double-acting piston element and said inlet when said valve means is selectively moved to said second position to thereby move said element connected to said steering linkage in a second direction, means for establishing simultaneous communication between both ends of said double-acting piston element and said inlet when said valve means is moved to said neutral position to thereby arrest movement of said element connected to said steering linkage, and means tending to restore said valve means to said neutral position from said operative positions to thereby transmit an opposing reaction to the manual effort required in holding said valve means in a selected one of said operative positions.

4. A power steering mechanism according to claim 2, wherein said control valve is provided with a casing and said valve seats are co-axially disposed at the remote ends of said valve chambers formed in said casing, said chambers being formed adjacent to one another and having a partition separating them, and wherein said valve faces are of annular form and co-axially spaced on said valve element, said valve element being formed between said valve faces with a cylindrical portion which is slidably guided for axial movement in said partition, and having a stem which extends slidably through the wall of said casing to the exterior thereof.

References Cited in the file of this patent

UNITED STATES PATENTS

| | | |
|---|---|---|
| 1,529,434 | Hynes | Mar. 10, 1925 |
| 1,983,900 | Ferris et al. | Dec. 11, 1934 |
| 2,625,136 | Moog | Jan. 13, 1953 |
| 2,687,706 | Glenny et al. | Aug. 31, 1954 |
| 2,786,454 | Bertsch | Mar. 26, 1957 |
| 2,796,851 | Ziskal | June 25, 1957 |